United States Patent [19]
Barrera et al.

[11] Patent Number: 5,550,995
[45] Date of Patent: Aug. 27, 1996

[54] MEMORY CACHE WITH AUTOMATIC ALLIASED ENTRY INVALIDATION AND METHOD OF OPERATION

[75] Inventors: David D. Barrera; Bahador Rastegar; Paul C. Rossbach, all of Austin, Tex.

[73] Assignees: Motorola, Inc., Schaumburg, Ill.; International Business Machines, Armonk, N.Y.

[21] Appl. No.: 176,812

[22] Filed: Jan. 3, 1994

[51] Int. Cl.⁶ ..................................................... G06F 12/12
[52] U.S. Cl. .......................... 395/403; 395/455; 395/420; 364/253; 364/243.41; 364/DIG. 1
[58] Field of Search ................................... 395/455, 412, 395/413, 403, 420, 460, 468

[56] References Cited

U.S. PATENT DOCUMENTS

| | | | |
|---|---|---|---|
| 4,669,043 | 5/1987 | Kaplinsky | 395/403 |
| 5,367,660 | 11/1994 | Gat et al. | 395/403 |
| 5,386,519 | 1/1995 | Nakamura et al. | 395/375 |

*Primary Examiner*—Eddie P. Chan
*Assistant Examiner*—Kevin L. Ellis
*Attorney, Agent, or Firm*—Lee E. Chastain; Michael A. Davis

[57] ABSTRACT

A memory cache (14) has a semi-associative cache array (50), a cache reload buffer (40), and a cache reload buffer driver (42). The memory cache writes received data to the cache reload buffer and waits until the data is requested again before it invalidates any cache aliased entries in the semi-associative cache array. This invalidation step requires no dedicated cycle but instead is a result of the memory cache being able to simultaneously read from the semi-associative cache array and the cache reload buffer.

18 Claims, 3 Drawing Sheets

5,550,995

MEMORY CACHE WITH AUTOMATIC ALLIASED ENTRY INVALIDATION AND METHOD OF OPERATION

FIELD OF THE INVENTION

The present invention generally relates to digital computing systems, and more specifically to a semi-associative memory cache.

BACKGROUND OF THE INVENTION

Memory caches are storage systems incorporated into data processing systems for performance reasons. A memory cache stores a subset of the contents of the data processing system's main memory for use by a selected subsystem, typically the system's data processor. A memory cache can supply data to the data processor faster than the main memory can because of several reasons. First, the memory cache is often made of higher grade memory circuits than is the main memory system. These circuits can simply operate at a higher clock rate than can the main memory. Also, there may be a dedicated bus between the data processor and the memory cache that results in higher bandwidth between the data processor and the memory cache than between the data processor and the main memory. Finally, a memory cache may be physically located on the same integrated circuit as the subsystem to which it provides data. In this case, the memory cache is constructed from faster circuits and there is a dedicated bus between the memory cache and the data processor.

Associativity is one variable that defines memory cache designs. Associativity describes the number of memory cache locations to which each main memory subsystem location may be mapped. For instance, the contents of each main memory location may be mapped to one of two different locations in a two-way set associative memory cache. When the data processor requests the contents of a certain main memory location, the data processor compares the contents of a tag associated with each of the two possible storage locations to a portion of the address of the requested data. The tag is stored in a random access memory ("RAM") associated with each memory cache entry or "cache line." One or none of the tags will match the address portion depending upon the prior history of the data processor. If one of the tags matches, then the associated memory cache location contains the requested data, a cache "hit." If neither of the tags matches, then no memory cache location contains the requested data, a cache "miss."

Indexing and tagging are other variables that define memory cache designs. Indexing describes what type of address the data processor uses to select entries in the memory cache. Tagging describes what type of address generated the tag associated with each entry in the cache line. Generally, data processing systems use at least two types of addresses. The data processor typically calculates addresses for purposes of fetching instructions in a first address format. These addresses are often called "effective" addresses. The main memory subsystem typically stores data according to a second addressing format. These addresses are often called "real" or "physical" addresses. A data processor in such a dual-addressing system contains translation tables to map addresses between the two formats.

Semi-associative caches are high performance cache memory systems. Semi-associative caches use content addressable memories ("CAMs") to narrow down the identity of the desired cache line to a single cache line before the real address is known. The validity of the data associated with the single cache line is determined by comparing its real address tag to the effective address translated by a translation array. No multiplexer stage is required to select one of N outputs, where N is the set associative way of the semi-associative cache. As described below, semi-associative caches are able to maintain the advantage of N-way associativity.

A CAM tag and a RAM tag are associated with each cache line in a semi-associative cache. The CAM stores a subset of the effective address of the cache line ("E-tag") and the RAM stores a subset of the real address of the cache line ("R-tag"). When the data processor needs a particular cache line, it binarily indexes into a certain number of cache lines with a first subset of the effective address and matches a second subset of the effective address against the contents of the CAMs in the certain number of cache lines. The certain number of cache lines is referred to as a "camlet." The number of entries in the camlet determines the way associativity of the memory cache. One or none of the CAMs in a particular camlet may match the second subset of the effective address. A match indicates that the requested data may be in the cache line associated with the matching CAM, an E-tag hit. The effective address must be translated into a real address and the real address compared to the R-tag of the matching cache line to determine if a full cache hit is appropriate.

Semi-associative caches suffer a problem known as "cache aliasing." Known solutions to cache aliasing themselves suffer several disadvantages. Cache aliasing occurs when two or more entries in a camlet have the same E-tag. This problem is especially acute after a memory cache request resulting in an E-tag hit and an R-tag miss. In this case, the memory cache must fetch data from main memory that will have, by definition, the same E-tag as the half-matching cache line. If the memory cache places this data directly into another cache line in the same camlet, then a cache alias will occur. The next request for this new data or for the data associated with the half-match will cause two CAMs to match and output their cache lines and R-tags. The memory cache will not operate properly if a cache alias OCCURS.

Prior solutions to cache aliasing required that a cache line immediately be invalidated after it generated the combination of an E-tag hit and an R-tag miss. This solution does preclude two camlet entries from ever having the same E-tag. However, this invalidated cache line may be useful to the data processor while the memory cache is fetching the previously requested cache line. The memory cache will be busy for one clock cycle during the invalidation step. This cycle might otherwise be used for other accesses to the memory cache. Also, this solution leads to added cache control logic complexity.

SUMMARY OF THE INVENTION

In accordance with the present invention, there is disclosed a memory cache which substantially eliminates disadvantages of known memory caches.

A memory cache has a semi-associative cache array, a cache reload buffer and cache reload buffer driver. The semi-associative cache array stores a plurality of sets. Each set has a first tag, a second tag and a data field. The semi-associative cache array receives a first subset and a second subset of an index. The first subset specifies a group of the plurality of sets. The semi-associative cache outputs the second tag and the data field of a selected one of the plurality of sets on a plurality of bit lines. The selected one of the sets is defined to be the one that is a member of the group and whose first tag is logically equivalent to the second subset. The cache reload buffer receives and stores a data field from an external source and a third tag. The cache reload buffer driver couples the data field of the cache reload buffer to the plurality of bit lines if the third tag and a third subset of the index are logically equivalent.

A method of operating a memory cache is also described comprising the steps of first receiving and storing a data field and a first tag in a cache reload buffer. The method continues with the steps of receiving a first subset and a second subset of an index in a semi-associative cache array. The semi-associative cache array stores a plurality of sets of a second tag, a third tag and a data field. The method continues with the steps of selecting a group of the plurality of sets responsive to the first subset, a selected group, comparing the second subset and a plurality of second tags of the selected group and outputting the data field of a selected one of the plurality of sets on a plurality of bit lines. The selected one is a member of the selected group and the second tag of the selected one is logically equivalent to the second subset. Finally, the method has the steps of receiving a third subset of the index in the cache reload buffer and coupling the data field of the cache reload buffer to the plurality of the bit lines by a cache reload buffer driver if the first tag and a third subset of the index are logically equivalent.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
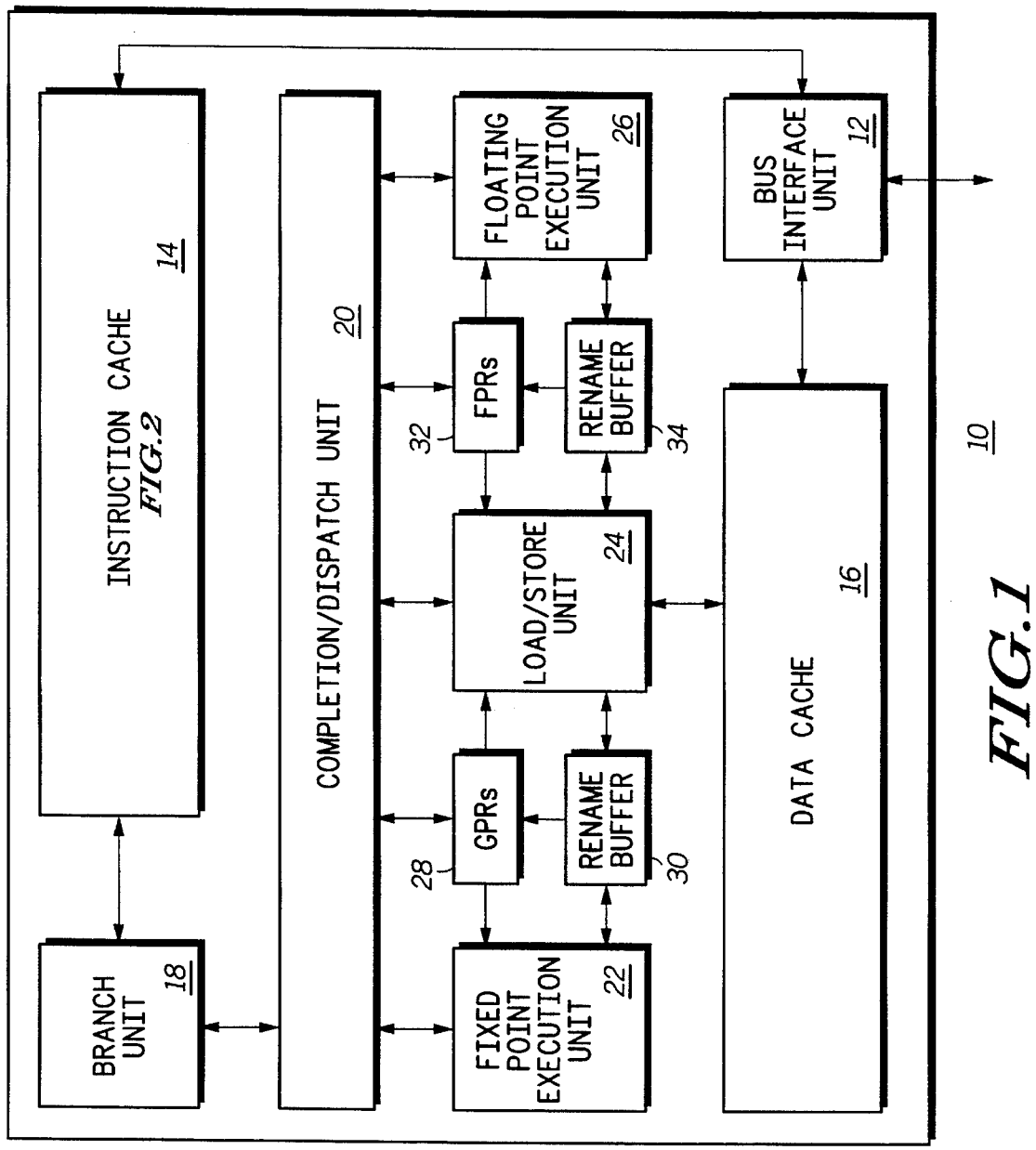
FIG. 1 depicts a block diagram of a data processor constructed in accordance with the present invention.

FIG. 1 depicts a block diagram of a data processor 10 constructed in accordance with the present invention. Data processor 10 is a data processor that improves its performance by incorporating a semi-associative instruction memory cache. As described above, a semi-associative cache may not have two entries in the same camlet with identical E-tags. This condition is known as "cache aliasing." The instruction cache avoids cache aliasing by using a cache reload buffer (depicted in FIG. 2) that can act like an additional cache line of the cache array. The cache reload buffer stores data returned from main memory until the data is requested again. If the buffered cache line is requested again, then the cache reload buffer and any other aliased cache line will both generate a hit. The cache reload buffer will overwrite the aliased entry with its contents as part of its output process. If the buffered cache line is not requested again, then the contents of the cache reload buffer will be overwritten with the next instructions returned from main memory. Meanwhile, the instructions stored in the aliased cache line entry are still available for use and no separate invalidation cycle is necessary.

Continuing with FIG. 1, a bus interface unit (hereafter BIU) 12 controls the flow of data between data processor 10 and the remainder of a data processing system (not depicted). (Typically, this data processing system has one or more data processors, a main memory system for storing data and instructions, a bus arbitration system and an input/output system interconnected via an address bus and a data bus. The input/output system provides an interface from the data processing system to a keyboard, a disk drive, an electronic network, etc. The bus arbitrator system receives requests from the other various systems of the data processing system for exclusive use of the data and or address buses. The bus arbitrator system grants these requests according to a protocol not relevant to the disclosed invention.)

BIU 12 is connected to an instruction cache 14 and to a data cache 16. Instruction cache 14 supplies an instruction stream to a branch unit 18 and to a completion/dispatch unit 20. Instruction cache 14 is more fully described below in connection with FIGS. 2 and 3. Completion/dispatch unit 20 forwards individual instructions to an appropriate execution unit. Data processor 10 has a fixed point execution unit 22, a load/store execution unit 24, and a floating point execution unit 26. Fixed point execution unit 22 and load/store execution unit 24 read and write their results to a general purpose architectural register file 28, (labeled GPRs and hereafter GPR file) and to a first rename buffer 30. Floating point execution unit 26 and load/store execution unit 24 read and write their results to a floating point architectural register file 32, (labeled FPRs and hereafter FPR file) and to a second rename buffer 34.

The operation of data processor 10 without the disclosed instruction cache is known in the art. In general, branch unit 18 determines what sequence of programmed instructions is appropriate given the contents of certain data registers and the program steps themselves. Completion/dispatch unit 20 issues the individual instructions to the various execution units 22, 24 and 26. Each of the execution units performs one or more instructions of a particular class of instructions. The particular class of instructions of each execution unit is indicated by the name of the execution unit. For instance, floating point execution unit 26 executes floating point arithmetic instructions.

Fixed point execution unit 22 returns the results of its operations to designated entries in first rename buffer 30. First rename buffer 30 periodically updates an entry of GPR file 28 with an entry from first rename buffer 30 when all instructions preceding the instruction that generated the result have updated their GPR file entries. Completion/dispatch unit 20 coordinates this updating. Both first rename buffer 30 and GPR file 28 can supply operands to fixed point execution unit 22. Conversely, floating point execution unit 26 returns the results of its operations to designated entries in second rename buffer 34. Second rename buffer 34 periodically updates an entry of FPR file 32 with an entry in second rename buffer 34 when all instructions preceding the instruction that generated the result have updated their FPR file entries. Completion/dispatch unit 20 also coordinates this updating. Both second rename buffer 34 and FPR file 32 supply operands to floating point execution unit 26.

Load/store unit 24 reads data stored in GPR file 28, first rename buffer 30, FPR file 32 or second rename buffer 34 and writes the selected data to data cache 16. This data may also be written to an external memory system (not depicted) depending upon operating characteristics of data processor 10 not relevant to the disclosed invention. Conversely, load/store unit 24 reads data stored in data cache 16 and writes the read data to GPR file 28, first rename buffer 30, FPR file 32 or second rename buffer 34.

The operation of data processor 10 with the disclosed instruction cache is described below in connection with FIGS. 2 through 3. In general, data processor 10 is a reduced instruction set computer ("RISC"). Data processor 10 achieves high performance by breaking each instruction into a sequence of smaller steps, each of which may be overlapped in time with steps of other instructions. This performance strategy is known as "pipe lining."

In the depicted embodiment, each instruction is broken into as many as five discrete steps: fetch, dispatch, execute, write-back, and completion. Memory management circuitry (shown in FIG. 2) within instruction cache 14 retrieves one or more instructions beginning at a memory address identified by branch unit 18 during the fetch phase. Completion/dispatch unit 20 routes each instruction to the appropriate execution unit after determining that there are no impermissible data dependencies and after reserving a rename buffer entry for the result of the instruction in the dispatch phase. Each particular execution unit executes its programmed instruction during the execution phase and writes its result, if any, to the reserved rename buffer entry during the write-back phase. Finally, completion/dispatch unit 20 updates the architectural register files with the result of a particular instruction stored in a rename buffer after every instruction preceding the particular instruction has so updated the architectural register file. Generally, each instruction phase takes one machine clock cycle. However, some instructions require more than one clock cycle to execute while others do not require all five phases. There may also be a delay between the write-back and completion phases of a particular instruction due to the range of times which the various instructions take to complete.

Figure 2:
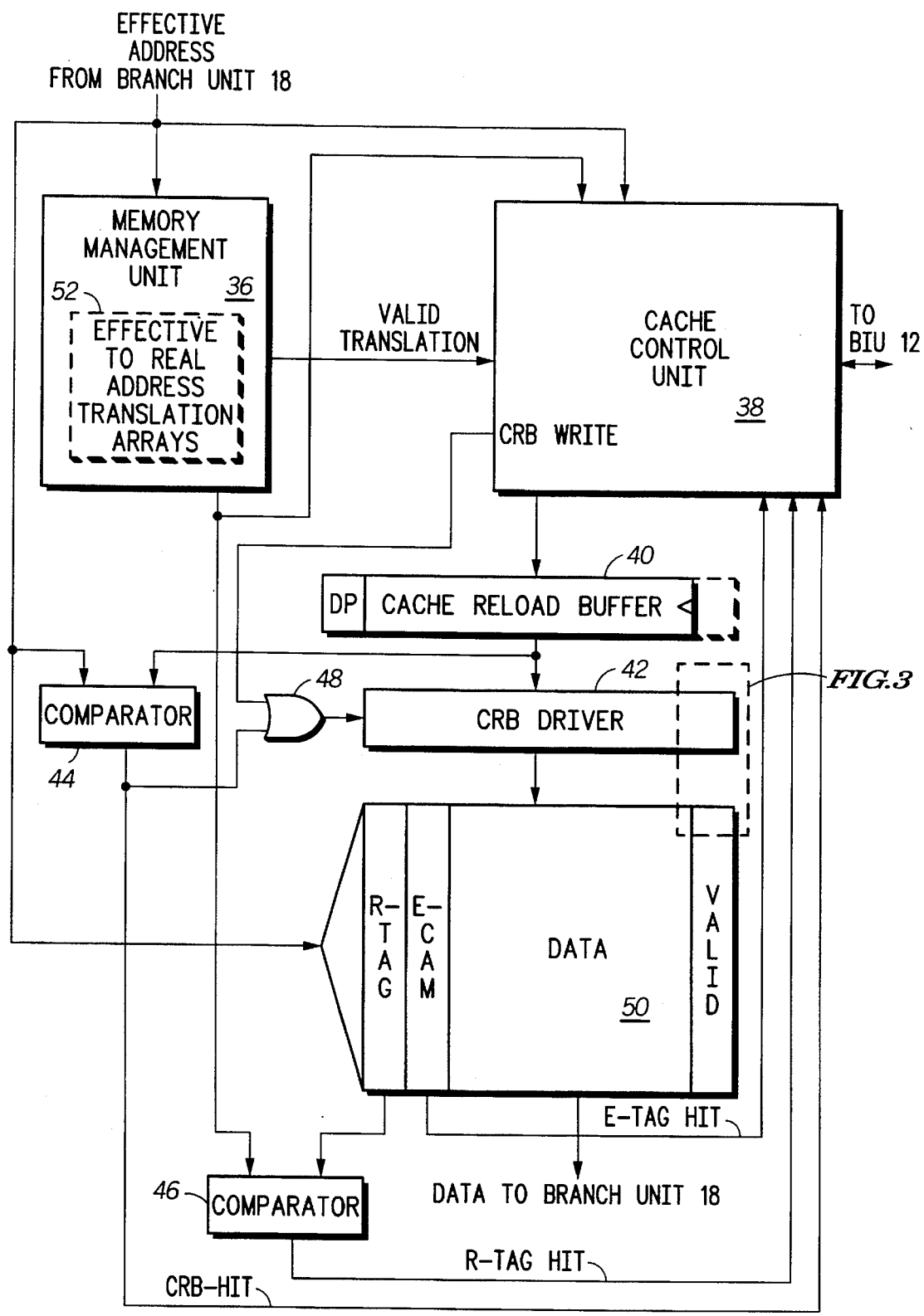
FIG. 2 depicts a block diagram of the instruction cache depicted in FIG. 1.

FIG. 2 depicts a block diagram of instruction cache 14 depicted in FIG. 1. Instruction cache 14 has a memory management unit (hereafter "MMU") 36, a cache control unit 38, a cache reload buffer (hereafter "CRB") 40, a cache reload buffer driver (labeled and hereafter "CRB driver") 42, a first comparator 44, a second comparator 46, and a instruction cache array (hereafter array) 50. MMU 36 contains one or more translation arrays 52 which it uses to map received effective addresses from branch unit 18 to real addresses. In the depicted embodiment, the addresses of data and instructions are indexed within data processor 10 with a first addressing system, an "effective address." The same addresses are indexed outside of data processor 10 with a second addressing system, a "real address."

Array 50 is a semi-associative cache which acts like an eight-way set associative cache. Array 50 contains 512 cache lines that each store four quad-words of instructions (sixteen instructions). The 512 cache lines are organized into two banks of thirty-two camlets. Each camlet contains eight cache lines. Every four quad-words of data may be mapped into one of the eight different cache lines in a particular camlet. Each cache line in array 50 has a RAM R-tag, a CAM E-tag (labeled "E-cam"), four quad words of instructions (labeled "DATA") and a valid bit implemented as a CAM bit-cell. Each R-tag stores the twenty-eight most significant bits of the real address of the cache line entry. (The R-tag may be implemented as a CAM device to facilitate external snoop operations.) Each E-cam stores the eight most significant bits of the effective address of the cache line entry. Each valid bit indicates whether or not the instructions stored in the cache line are valid.

In operation, instruction cache 14 receives a sixty-four bit effective address ($EA_0$ through $EA_{63}$, most significant bit to least significant bit) from branch unit 18 each clock cycle (the address does not always change between subsequent clock cycles). MMU 36 translates $EA_0$ through $EA_{51}$ into the twenty-eight most significant bits ($RA_0$ through $RA_{27}$) of the corresponding real address ($RA_0$ through $RA_{39}$, most significant bit to least significant bit). Array 50 selects a single cache line as MMU 36 performs its effective to real translation. Array 50 indexes into one camlet with $EA_{52}$ through $EA_{57}$ while attempting to match $EA_{44}$ through $EA_{51}$ with one of the eight E-tags in the one camlet.

If array 50 finds an E-tag match in the one camlet, then the matching E-cam asserts a control signal E-TAG HIT to cache control unit 38. The associated cache line will output its sixteen instructions to branch unit 18. (Other circuitry in instruction cache 14 will select four of the sixteen instructions with $EA_{58}$ through $EA_{61}$ for branch unit 18.) At his point, the E-tag hit is only a possible hit. Second comparator 46 determines if each E-tag hit is an actual cache hit. Second comparator 46 receives $RA_0$ through $RA_{27}$ from MMU 36 and the contents of the R-tag from the matching cache line from array 50. Second comparator 46 asserts a control signal R-TAG HIT if the two bit fields are identical, a cache hit. MMU 36 asserts a control signal VALID TRANSLATION when it translates an effective address into a real address. Cache control unit 38 ignores an R-tag hit if MMU 36 does not assert VALID TRANSLATION. Second comparator 46 de-asserts R-TAG HIT if the two bit fields differ, a cache miss. In this case, cache control unit 38 forwards a request for the four-quad words beginning at the forty-bit real address generated by concatenating $RA_0$ through $RA_{27}$ and $EA_{52}$ through $EA_{63}$ to BIU 12. If an instruction cache access generates an E-tag HIT and an R-tag miss, then a cache alias may be created when BIU 12 returns the requested instructions. The solution to this problem is described below.

If array 50 does not find an E-tag match in the one camlet, then a cache miss occurs and no cache line will assert E-TAG HIT. No further computation is required. In this case, cache control unit 38 also forwards a request for the four-quad words beginning at the forty-bit real address generated by concatenating $RA_0$ through $RA_{27}$ and $EA_{52}$ through $EA_{63}$ to BIU 12. No cache alias will be created when BIU 12 returns the requested instructions.

Cache control unit 38 regulates the addition of data to array 50 and, hence, is responsible for avoiding cache aliasing problems. As described above, cache control unit 38 forwards the address of sixteen instructions to BIU 12 after an E-tag or an R-tag miss. Cache control unit 38 saves $RA_0$ through $RA_{27}$ and $EA_0$ through $EA_{51}$ for reasons which will become apparent below. Eventually, BIU 12 returns the requested instructions to cache control unit 38 one quad word at a time. Cache control unit 38 writes the four quad words into CRB 40 along with the stored R-tag and the extended E-tag. Cache control unit 38 sets a data present bit (labeled "DP") when it writes the first quad word to CRB 40. Cache control unit 38 does not immediately write the data in CRB 40 into array 50.

CRB 40 acts like an additional cache line once cache control unit 38 places data into it. The bit fields that are common to both CRB 40 and array 50 are coupled through CRB wordline driver 42. The R-tag, E-tag ($EA_{44}$ through $EA_{51}$) and data fields are common between CRB 40 and data array 50. (CRB 40 and array 50 are intentionally not aligned in the horizontal plane to accent the slight difference in data fields.) CRB driver 42 is described below in connection with FIG. 3. Instructions stored in CRB 40 can be output through the same path as are the instructions stored in array 50.

During each clock cycle, cache array 50 may output one R-tag and four quad words of instructions as described above. During each of these cache access, first comparator 44 also compares the extended E-tag stored in CRB 40 with $EA_0$ through $EA_{51}$ received from branch unit 18. First comparator 44 asserts the control signal CRB-HIT if these two bit fields match and the data present bit is set. A first input of OR gate 48 receives CRB-HIT. An input of OR gate 48 is coupled to CRB driver 42. CRB driver 42 couples those data fields in CRB 40 which are common with the bit fields in array 50 to the bit-lines of array 50 when OR gate 42 asserts its output. In this case, the data field of CRB 40 is output to branch unit 18.

As described above, the contents of CRB 40 may be aliased elsewhere in array 50. In this case, the E-tag of the aliased entry will match the input effective address field, enabling the wordline driver of the aliased cache line. CRB driver 42 will invalidate the valid bit of the aliased cache line as it outputs the contents of CRB 42 to branch unit 18. The devices in CRB 40 and CRB driver 42 are sized with respect to the devices in array 50 such that the data from CRB 40 overwrites the data from the aliased cache entry. If there is no cache alias, then CRB driver 42 can not invalidate any entry in array 50. According to the disclosed invention, no dedicated invalidate cycle is necessary to eliminate the cache alias. Also, any aliased cache line remains in array 50 until branch unit 18 requests the instructions residing in CRB 40. Branch unit 18 predicts the target address for certain branch instructions. Therefore, the address supplied by branch unit 18 may change once branch unit 18 determines the condition on which its earlier prediction was based. In these cases, it is advantageous to not invalidate the aliased cache line because that line may be used at a later time. Meanwhile, the contents of the CRB 40 will not be used in the immediate future.

Cache control unit 38 generates a control signal CRB WRITE which is connected to the second input of OR gate 48. Cache control unit 38 can write data from CRB 40 into array 50 by asserting CRB WRITE and asserting the wordline of a particular entry in array 50. Cache control unit 38 may assert a particular wordline by any one of several replacement methods known in the art.

Figure 3:
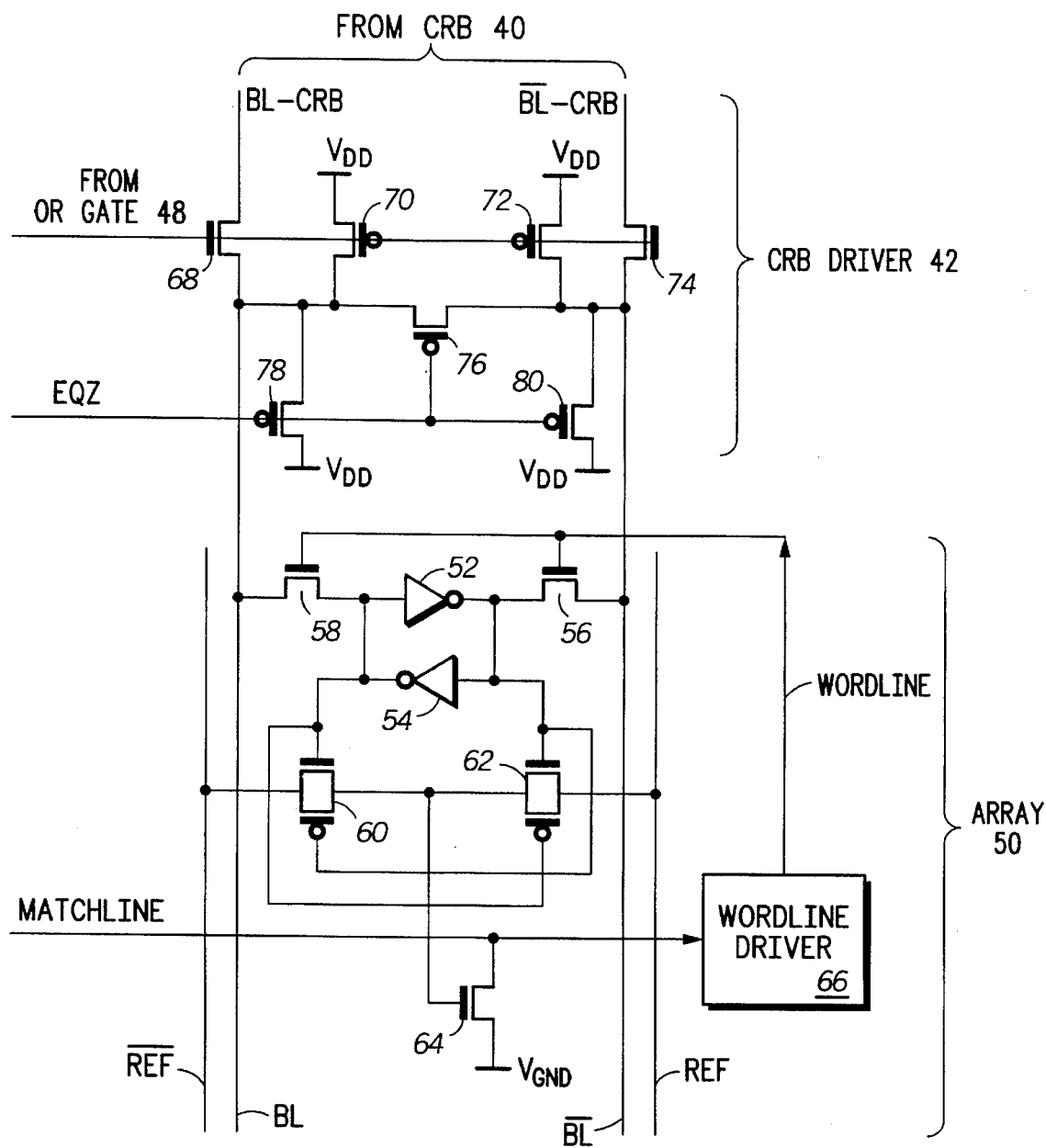
FIG. 3 depicts, in detail, the portion of the cache reload buffer driver and the cache array depicted in FIG. 2 and enclosed by the dashed line.

FIG. 3 depicts, in detail, the portion of CRB driver 42 and array 50 depicted in FIG. 2 and enclosed by the dashed line. In particular, FIG. 3 depicts the valid bit associated with the first cache line in array 50. It should be understood that all other bit-cells in array 50 are similar to the valid bit cell. The differences will be noted where relevant.

A first inverter 52 and a second inverter 54 store one of two possible logic states for the valid bit. An output of first inverter 52 is connected to an input of second inverter 54 and to a first current electrode of a transistor 56. An output of second inverter 54 is connected to an input of first inverter 52 and to a first current electrode of a transistor 58. A control electrode of transistors 56 and 58 receive a control signal WORDLINE. The second current electrode of transistor 56 is connected to a logical complement of a bit line signal (labeled and hereafter $\overline{BL}$). The second current electrode of transistor 58 is connected to the bit line signal (labeled and hereafter BL). Every valid bit cell in array 50 is connected to BL and $\overline{BL}$ in a similar fashion.

Each valid bit in array 50 is implemented as a CAM cell. Therefore, the output of second inverter 54 is connected to the n channel device of a first pass gate 60 and to the p channel device of a second pass gate 62. Also, the output of first inverter 52 is connected to the n channel device of second pass gate 62 and to the p channel device of first pass gate 60. First and second pass gates 60 and 62 couple the logical complement of the reference signal (labeled and hereafter $\overline{REF}$) and the reference signal (labeled and hereafter REF), respectively, to the control electrode of a transistor 64. A first current electrode of transistor 64 is connected to the signal MATCHLINE. A wordline driver 66 receives the signal MATCHLINE, latches it, and generates the signal WORDLINE. Wordline driver 66 may also receive a decoded address signal from cache control logic 38 to facilitate read and write operations from array 50. A second current electrode of transistor 64 receives a first voltage supply (labeled $V_{GND}$). Every valid bit cell in array 50 is connected to REF and $\overline{REF}$ in a similar fashion. Every E-tag CAM cell in the first cache line is connected to MATCHLINE in a similar fashion. The non-CAM cells in the first cache line do not include first and second pass gates 60 and 64 nor transistor 64.

The output of OR gate 48 is connected to the control electrode of transistors 68, 70, 72, and 74. Transistors 68 and 74 are n channel devices. Conversely, transistors 70 and 72 are p channel devices. A first current electrode of transistor 68 is connected to a bit line signal generated by CRB 40 (labeled and hereafter BL-CRB). A first current electrode of transistor 74 is connected to a logical complement of the bit line signal generated by CRB 40 (labeled and hereafter $\overline{BL}$-CRB). CRB 40 does not contain a valid bit. Instead cache control unit 38 generates this signal as described below. A first current electrode of transistors 70 and 72 receive a second voltage supply (labeled $V_{DD}$). A second current electrode of transistors 68 and 70 are connected to BL and to a first current electrode of a transistor 76. A second current electrode of transistors 72 and 74 are connected to the $\overline{BL}$ and to a second current electrode of transistor 76. A control electrode of transistors 76, 78 and 80 receive a control signal EQZ. A first current electrode and a second current electrode of transistor 78 are connected to BL and to $V_{DD}$, respectively. A first current electrode and a second current electrode of transistor 80 are connected to $\overline{BL}$ and to $V_{DD}$, respectively. Transistors 76, 78, and 80 are p channel devices. Cache control unit 38 generates the control signal EQZ.

During the second phase of a periodic clocking signal (not shown), wordline driver 66 precharges MATCHLINE to a high voltage level, other circuitry (not shown) precharges REF and $\overline{REF}$ to a low voltage level, and cache control unit 38 asserts EQZ, precharging BL and $\overline{BL}$ to a high voltage level. During the first phase of the subsequent clock cycle, the effective address is applied to the E-tags of a selected camlet. A valid logic state is also applied to each valid bit in the camlet via the REF and $\overline{REF}$ signals. If the input bit field matches the stored bits in one of the cache lines in the camlet, then MATCHLINE will remain high causing wordline driver 66 to output all of the stored data field bits in the matching and valid cache line via the BL and $\overline{BL}$ signals. If any one or more input bits do not match the corresponding stored bits in a particular cache line, then the one or more stored bits will discharge MATCHLINE. Wordline driver 66 will not select the non-matching cache line.

As described above. CRB 40 acts like an additional cache line. $EA_0$ through $EA_{51}$ is applied to the extended E-tag of CRB 40. If there is a CRB-HIT, then OR gate 48 will couple BL and $\overline{BL}$ to BL-CRB and $\overline{BL}$-CRB, respectively. The contents of CRB will be output to the same sense amplifiers (not shown) that output data stored in array 50. On a CRB-HIT, cache control unit 38 will de-assert BL-CRB and assert $\overline{BL}$-CRB corresponding to the valid bits of array 50. This action automatically invalidates any matching cache line in array 50. At this point, the only matching cache line is a cache alias. If CRB 40 does not hit on the input effective address, then transistors 68 and 74 will uncouple CRB 40 from array 50 and only data stored in array 50 may be output to branch unit 18.

As described above, cache control unit 38 performs other write operations. Cache control unit 38 may write the contents of CRB 40 into a particular cache line by enabling the wordline driver of the particular cache line, by asserting CRB WRITE, and by asserting BL-CRB associated with the valid bits of array 50. Cache control unit 38 writes the contents of CRB 40 into a particular cache line according to a replacement scheme not relevant to the disclosed invention. Cache control unit 38 only writes the contents of CRB 40 into array 50 after CRB 40 hits. Cache control unit 38 waits to do this until a subsequent instruction fetch from main memory.

Although the present invention has been described with reference to a specific embodiment, further modifications and improvements will occur to those skilled in the art. For instance, the disclosed invention may stand alone or may be incorporated into data processors traditionally classified as complex instruction set computers or CISC machines. Also, certain functional units may be omitted in certain embodiments or relocated to other areas of instruction cache 14. It is to be understood therefore, that the invention encompasses all such modifications that do not depart from the spirit and scope of the invention as defined in the appended claims.

What is claimed is:

1. A memory cache comprising:
    a semi-associative cache array storing a plurality of sets, each one of the plurality of sets further comprising a first tag, a second tag, a data field, and a means for indicating the validity of the one of the plurality of the sets, the semi-associative cache array receiving a first subset and a second subset of an index, the first subset specifying a group of the plurality of sets, the semi-associative cache outputting the second tag and the data field of a selected one of the plurality of sets, the selected one of the plurality of sets being a member of the group, the first tag of the selected one of the plurality of sets being logically equivalent to the second subset, the data field of the selected one output on a plurality of bit lines;
    a cache reload buffer receiving a data field from an external source and a third tag, the cache reload buffer storing the third tag and the data field; and
    a cache reload buffer driver coupled to the cache reload buffer and to the semi-associative cache array, the cache reload buffer driver coupling the data field of the cache reload buffer to the plurality of bit lines if the third tag and a third subset of the index are logically equivalent,
    wherein the cache array sets the means for indicating the validity of the selected one to an invalid state upon an equivalence of the third tag and the third subset.

2. The memory cache of claim 1 further comprising a comparator coupled to the semi-associative cache array, the comparator asserting a first control signal if the second tag of the selected one of the sets is logically equivalent to a received translated tag.

3. The memory cache of claim 2 further comprising a memory management unit coupled to the semi-associative cache array and to the comparator, the memory management unit translating a received input address to generate the received translated tag.

4. The memory cache of claim 3 further comprising a cache control unit coupled to the cache reload buffer driver and to the semi-associative cache array, the cache control unit requesting data from the external source responsive to a non-assertion of the first control signal, the cache control unit receiving data from the external source, the cache control unit writing the data to the cache reload buffer.

5. A data processor comprising:
    the memory cache of claim 4; and
    a branch prediction unit for generating the received input address responsive to an instruction.

6. A memory cache comprising:
    a memory management unit translating a received input address into a real tag;
    a cache array coupled to the memory management unit comprising:
        a plurality of bit lines;
        a plurality of camlets, each camlet receiving a first subset of the received input address, the first subset selecting one of the plurality of camlets, a selected camlet, each camlet comprising a plurality of cache lines, each cache line comprising;
            a plurality of content addressable memory bit cells storing a first cache line tag, the plurality of content addressable memory bit cells receiving a second subset of the received input address, the plurality of content addressable memory cells asserting a first control signal if the second subset and the first cache line tag are logically equivalent and if the plurality of content addressable memory bit cells are a member of the selected camlet;
        a plurality of cache line bit cells storing data and a second cache line tag;
        a wordline driver, the wordline driver of the selected camlet coupling a differing one of the plurality of bit lines to a differing one of the plurality of cache line bit cells responsive to the assertion of the first control signal;
    a cache reload buffer storing a cache reload buffer tag and a data field in a plurality of bit cells; and
    a cache reload buffer driver coupled to the cache reload buffer and to the cache array, the cache reload buffer driver coupling a differing one of the plurality of bit lines to a differing one of the plurality of cache reload buffer bit cells if the cache reload buffer tag and a third subset of the received input address are logically equivalent and the cache array simultaneously invalidating one of the plurality of cache lines if the second subset is equivalent to the first cache line tag of the one of the plurality of cache lines.

7. The memory cache of claim 6 further comprising a comparator coupled to the memory management unit and to the cache array, the comparator asserting a second control signal if the real tag and a second cache line tag coupled to the plurality of bit lines are logically equivalent 8. The memory cache of claim 7 further comprising a cache control unit coupled to the cache reload buffer driver and to the cache array, the cache control unit requesting data from an external source responsive to a non-assertion of the first control signal, the cache control unit receiving data from the external source, the cache control unit writing the data to the cache reload buffer.

9. A data processor comprising:
    the memory cache of claim 8; and
    a branch prediction unit for generating the received input address responsive to program instructions.

10. The memory cache of claim 6 further comprising a cache control unit coupled to the cache reload buffer driver and to the cache array, the cache control unit requesting data from an external source responsive to a non-assertion of the first control signal, the cache control unit receiving data from the external source, the cache control unit writing the data to the cache reload buffer.

11. A data processor comprising:

the memory cache of claim 10; and a branch prediction unit for generating the received input address responsive to program instructions.

12. A data processor comprising:

the cache array of claim 6; and a branch prediction unit for generating the received input address responsive to program instructions.

13. A method of operating a memory cache comprising the steps of:

first receiving a data field external to the memory cache and a first tag in a cache reload buffer;

storing the data field and the first tag in the cache reload buffer;

second receiving a first subset and a second subset of an index in a semi-associative cache array, the semi-associative cache array storing a plurality of sets of a second tag, a third tag and a data field;

selecting a group of the plurality of sets responsive to the first subset, a selected group;

first comparing the second subset and a plurality of second tags of the selected group;

outputting the data field of a selected one of the plurality of sets on a plurality of bit lines, the selected one being a member of the selected group, the second tag of the selected one being logically equivalent to the second subset;

third receiving a third subset of the index in the cache reload buffer; and coupling the data field of the cache reload buffer to the plurality of the bit lines with a cache reload buffer driver if the first tag and a third subset of the index are logically equivalent and simultaneously invalidating one of the plurality of sets if the second tag of the one of the plurality of sets is logically equivalent to the second subset.

14. The method of claim 13 further comprising the step of second comparing a real tag and the third tag of the selected one.

15. The method of claim 14 further comprising the step of translating a received input address to generate the real tag in a memory management unit coupled to the semi-associative cache array and to the comparator.

16. The method of claim 15 further comprising the step of requesting data from a source external to the memory cache by a cache control unit coupled to the cache reload buffer driver and to the semi-associative cache array, the request responsive to the steps of first and second comparing.

17. The method of claim 16 further comprising the step of invalidating the selected one of the plurality of sets by the cache control unit responsive to the step of coupling the data field of the cache reload buffer to the plurality of the bit lines.

18. A method of operating a data processor comprising the steps of:

operating the memory cache of claim 17; and generating the received index address responsive to an instruction in a branch prediction unit coupled to the memory cache.

* * * * *